United States Patent
Wu et al.

(10) Patent No.: US 10,790,945 B2
(45) Date of Patent: *Sep. 29, 2020

(54) METHODS TO MITIGATE INTER-PLATOON INTERFERENCE

(71) Applicant: QUALCOMM Incorporated, San Diego, CA (US)

(72) Inventors: Zhibin Wu, Bedminster, NJ (US); Shailesh Patil, San Diego, CA (US); Junyi Li, Chester, NJ (US); Sudhir Kumar Baghel, Hillsborough, NJ (US); Kapil Gulati, Dover, DE (US); Georgios Tsirtsis, London (GB); Libin Jiang, Bridgewater, NJ (US); Tien Viet Nguyen, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/922,618

(22) Filed: Mar. 15, 2018

(65) Prior Publication Data

US 2018/0278385 A1 Sep. 27, 2018

(30) Foreign Application Priority Data

Mar. 23, 2017 (GR) .............................. 20170100116

(51) Int. Cl.
*H04L 5/00* (2006.01)
*H04J 11/00* (2006.01)
(Continued)

(52) U.S. Cl.
CPC .......... *H04L 5/0007* (2013.01); *G05D 1/0289* (2013.01); *G05D 1/0295* (2013.01); *G08G 1/22* (2013.01); *H04J 11/005* (2013.01); *H04J 11/0023* (2013.01); *H04W 72/048* (2013.01); *H04W 72/121* (2013.01);
(Continued)

(58) Field of Classification Search
CPC .. H04L 5/00; H04L 5/007; H04J 11/00; H04J 11/005; G05D 1/02; G05D 1/0295
See application file for complete search history.

(56) References Cited

U.S. PATENT DOCUMENTS

| 2012/0087292 A1* | 4/2012 | Grimm | H04W 72/02 370/312 |
| 2012/0134336 A1* | 5/2012 | Nakaya | G08G 1/094 370/330 |

(Continued)

OTHER PUBLICATIONS

International Search Report and Written Opinion—PCT/US2018/022897—ISA/EPO—dated Jun. 14, 2018.

*Primary Examiner* — Chi Ho A Lee
*Assistant Examiner* — Andrew Lee
(74) *Attorney, Agent, or Firm* — Holland & Hart LLP

(57) ABSTRACT

Methods, systems, and devices for wireless communication are described. A user equipment (UE), e.g., a vehicle in a group of platooning vehicles configured for wireless communications, may identify a travel direction of the group of platooning vehicles. The UE may identify a set of time-frequency radio resources allocated to the travel direction. The UE may perform inter-vehicle communications with one or more neighboring vehicles of the group of platooning vehicles using the set of time-frequency radio resources.

26 Claims, 12 Drawing Sheets

(51) Int. Cl.
*G05D 1/02* (2020.01)
*H04W 72/04* (2009.01)
*H04W 72/12* (2009.01)
*G08G 1/00* (2006.01)
*H04W 72/08* (2009.01)
*H04W 84/00* (2009.01)
*H04W 16/14* (2009.01)

(52) U.S. Cl.
CPC ............ *H04L 5/001* (2013.01); *H04L 5/0044* (2013.01); *H04W 16/14* (2013.01); *H04W 72/082* (2013.01); *H04W 84/005* (2013.01)

(56) References Cited

U.S. PATENT DOCUMENTS

| | | | |
|---|---|---|---|
| 2014/0269604 A1* | 9/2014 | Kamiya | H04L 5/0066 370/330 |
| 2014/0316865 A1* | 10/2014 | Okamoto | G08G 1/22 705/14.1 |
| 2016/0128075 A1* | 5/2016 | Kremo | H04W 16/14 455/506 |
| 2016/0183276 A1 | 6/2016 | Marinier et al. | |
| 2016/0212596 A1 | 7/2016 | Brahmi et al. | |
| 2016/0295624 A1 | 10/2016 | Novlan et al. | |
| 2016/0338122 A1* | 11/2016 | Tsai | H04W 8/005 |
| 2017/0289864 A1* | 10/2017 | Narasimha | H04W 36/0027 |
| 2017/0290031 A1* | 10/2017 | Hwang | H04W 72/14 |
| 2017/0352201 A1* | 12/2017 | Kumabe | G07C 5/008 |
| 2018/0082590 A1* | 3/2018 | MacNeille | G08G 1/0133 |
| 2018/0132110 A1* | 5/2018 | Furuichi | H04L 43/0894 |
| 2018/0253976 A1* | 9/2018 | Inam | G08G 1/096708 |
| 2019/0080373 A1* | 3/2019 | Takoshima | G06Q 10/04 |

\* cited by examiner

METHODS TO MITIGATE INTER-PLATOON INTERFERENCE

CROSS REFERENCES

The present Application for Patent claims priority to Greek Application No. 2017010016 by WU, et al., entitled "Methods To Mitigate Inter-Platoon Interference," filed Mar. 23, 2017, assigned to the assignee hereof.

INTRODUCTION

The following relates generally to wireless communication, and more specifically to methods to mitigate inter-platoon interference.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

One example of such vehicle based communication networks may support platooning, which coordinates the movement of a group of vehicles to reduce the inter-vehicle distance, improve lane capacity, reduce drag/increase fuel efficiency, and the like. To maintain the stability of the vehicle-following behaviors, e.g., to keep constant spacing between platooning vehicles, a vehicle in the platoon typically sends its own position/location, speed, acceleration, and other such information to its adjacent vehicles. A vehicle may also share this information to the other vehicles in the platoon of vehicles to help stabilize the platoon of vehicles. Such intra-platoon (or inter-vehicle) communications are wireless communication with radio resources, which need to be managed efficiently to avoid interference and collision.

One concern with such platooning operations is interference caused by transmissions from other vehicles (e.g., vehicles in a different platoon), which may impact the performance of the intra-platoon communications. In conventional V2X networks, a sensing-based scheme is used by all vehicles to resolve the interference issue when multiple vehicles in close proximity share the same time-frequency radio resource pools to send messages. That is, each V2X UE typically maintains a sensing history of all the candidate radio resources, and chooses the resource which is the least likely to be used (based on energy sensing or decoding control signaling transmitted by other vehicle UEs). However, there is a potential collision issue using this conventional scheme for the platoons. A vehicle platoon may happen to use the same resource which are currently used by vehicle(s) moving in the opposite direction of a roadway. As the relative speed of those vehicles may be high, the V2X transmitter of the platoon vehicle may not have enough time to sense the resource usage of incoming interfering UEs and adapt to a different resource to avoid the upcoming collision of radio transmissions. For the platoon communication, the reliability of such communications is critical because intra-platoon communications are essential to maintain the safety and stability of the platoon. Failure to receive the information from other platoon vehicles may create uncertainty in platoon vehicle control and endanger the safety of the platoon and other road users.

SUMMARY

A method of for wireless communication is described. The method may include identifying a travel direction of a group of platooning vehicles, identifying a set of time-frequency radio resources allocated to the travel direction, and performing inter-vehicle communications with one or more neighboring vehicles of the group of platooning vehicles using the set of time-frequency radio resources.

An apparatus for wireless communication is described. The apparatus may include means for identifying a travel direction of a group of platooning vehicles, means for identifying a set of time-frequency radio resources allocated to the travel direction, and means for performing inter-vehicle communications with one or more neighboring vehicles of the group of platooning vehicles using the set of time-frequency radio resources.

Another apparatus for wireless communication is described. The apparatus may include a processor, memory in electronic communication with the processor, and instructions stored in the memory. The instructions may be operable to cause the processor to identify a travel direction of a group of platooning vehicles, identify a set of time-frequency radio resources allocated to the travel direction, and perform inter-vehicle communications with one or more neighboring vehicles of the group of platooning vehicles using the set of time-frequency radio resources.

A non-transitory computer readable medium for wireless communication is described. The non-transitory computer-readable medium may include instructions operable to cause a processor to identify a travel direction of a group of platooning vehicles, identify a set of time-frequency radio resources allocated to the travel direction, and perform inter-vehicle communications with one or more neighboring vehicles of the group of platooning vehicles using the set of time-frequency radio resources.

Some examples of the method, apparatus, and non-transitory computer-readable medium described above may further include processes, features, means, or instructions for frequency-division multiplexing the set of time-frequency radio resources allocated to the travel direction with a second set of time-frequency radio resources allocated to platooning vehicles traveling in a different travel direction.

Some examples of the method, apparatus, and non-transitory computer-readable medium described above may further include processes, features, means, or instructions for identifying the travel direction based on identifying a lane in which the group of platooning vehicles may be traveling, accessing multiple instances of positioning information associated with the vehicle over a time period, receiving travel direction information from at least one other vehicle in the group of platooning vehicles, based on a positioning or orientation sensor associated with the vehicle, or combinations thereof.

Some examples of the method, apparatus, and non-transitory computer-readable medium described above may further include processes, features, means, or instructions for receiving a resource allocation message conveying information identifying the set of time-frequency radio resources allocated to the travel direction.

Some examples of the method, apparatus, and non-transitory computer-readable medium described above may further include processes, features, means, or instructions for accessing a pre-configured resource pool to identify the set of time-frequency radio resources allocated to the travel direction.

In some examples of the method, apparatus, and non-transitory computer-readable medium described above, the time-frequency radio resources comprise a resource in a licensed radio frequency spectrum band, a resource in an unlicensed radio frequency spectrum band, or combinations thereof.

A method of for wireless communication is described. The method may include identifying a random seed for time-frequency radio resource identification, the random seed based on a travel direction of a group of platooning vehicles, generating, based at least in part on the random seed, a pseudo-random sequence for use in selecting a subset of time-frequency radio resources, the subset of time-frequency radio resources being from a set of available time-frequency radio resources available for use by a plurality of groups of platooning vehicles traveling in different directions, and selecting, according to the pseudo-random sequence, the subset of time-frequency radio resources for inter-vehicle communications between the group of platooning vehicles.

An apparatus for wireless communication is described. The apparatus may include means for identifying a random seed for time-frequency radio resource identification, the random seed based on a travel direction of a group of platooning vehicles, means for generating, based at least in part on the random seed, a pseudo-random sequence for use in selecting a subset of time-frequency radio resources, the subset of time-frequency radio resources being from a set of available time-frequency radio resources available for use by a plurality of groups of platooning vehicles traveling in different directions, and means for selecting, according to the pseudo-random sequence, the subset of time-frequency radio resources for inter-vehicle communications between the group of platooning vehicles.

Another apparatus for wireless communication is described. The apparatus may include a processor, memory in electronic communication with the processor, and instructions stored in the memory. The instructions may be operable to cause the processor to identify a random seed for time-frequency radio resource identification, the random seed based on a travel direction of a group of platooning vehicles, generate, based at least in part on the random seed, a pseudo-random sequence for use in selecting a subset of time-frequency radio resources, the subset of time-frequency radio resources being from a set of available time-frequency radio resources available for use by a plurality of groups of platooning vehicles traveling in different directions, and select, according to the pseudo-random sequence, the subset of time-frequency radio resources for inter-vehicle communications between the group of platooning vehicles.

A non-transitory computer readable medium for wireless communication is described. The non-transitory computer-readable medium may include instructions operable to cause a processor to identify a random seed for time-frequency radio resource identification, the random seed based on a travel direction of a group of platooning vehicles, generate, based at least in part on the random seed, a pseudo-random sequence for use in selecting a subset of time-frequency radio resources, the subset of time-frequency radio resources being from a set of available time-frequency radio resources available for use by a plurality of groups of platooning vehicles traveling in different directions, and select, according to the pseudo-random sequence, the subset of time-frequency radio resources for inter-vehicle communications between the group of platooning vehicles.

Some examples of the method, apparatus, and non-transitory computer-readable medium described above may further include processes, features, means, or instructions for performing inter-vehicle communications with one or more neighboring vehicles within the group of platooning vehicles using the subset of time-frequency radio resources.

Some examples of the method, apparatus, and non-transitory computer-readable medium described above may further include processes, features, means, or instructions for identifying the travel direction of the group of platooning vehicles based on identifying a lane in which the group of platooning vehicles may be traveling, accessing multiple instances of positioning information associated with the vehicle over a predetermined time period, receiving travel direction information from at least one other vehicle in the group of platooning vehicles, based on a positioning or orientation sensor associated with the vehicle, or combinations thereof.

Some examples of the method, apparatus, and non-transitory computer-readable medium described above may further include processes, features, means, or instructions for receiving a message conveying an indication of the random seed.

DETAILED DESCRIPTION

Figure 1:
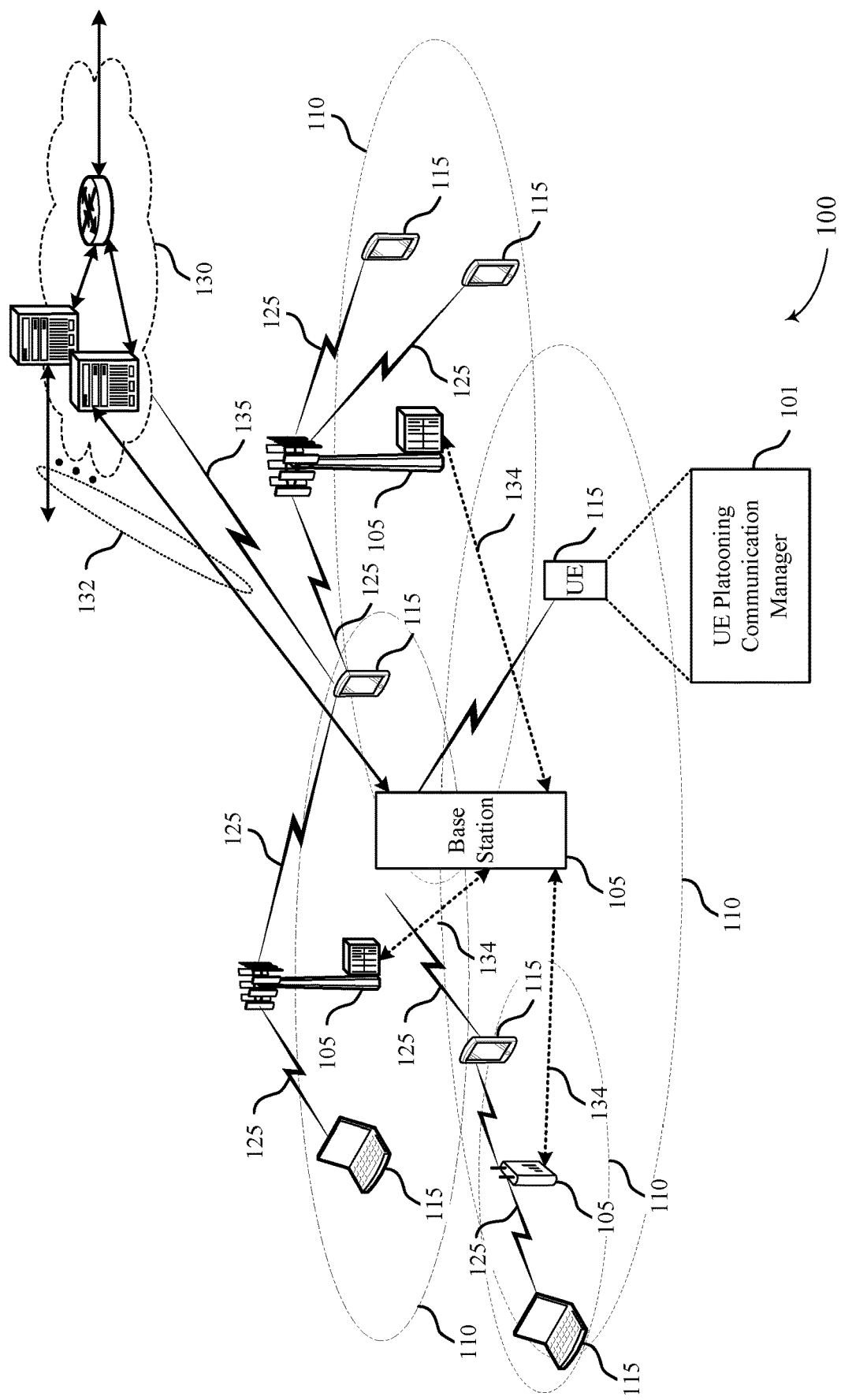
FIG. 1 illustrates an example of a system for wireless communication that supports methods to mitigate inter-platoon interference, in accordance with one or more aspects of the present disclosure.

Platooning is a technology that coordinates the movement of a group of vehicles (the group of platooning vehicles) to manage the separation of the vehicles, to manage vehicle speeds, and the like. Groups of platooning vehicles may be formed on an ad-hoc basis depending on V2V information exchanged between the vehicles, V2X information exchanged between the vehicles and the base station/network, and the like. For example, a platoon of vehicles may be dynamically formed whenever a certain number of vehicles are traveling in the same direction (e.g., in the same or adjacent lanes of traffic), at roughly the same speed, and so on in order to achieve certain advantages, e.g., improved fuel efficiency, manage traffic flow, improve collision avoidance, etc. Moreover, vehicles may leave the platoon and/or be added to the group of platooning vehicles as needed. Coordination of the group of platooning vehicles may use wireless communications, such as V2V, V2X, V2I, etc.

Certain considerations when using wireless communication is that a UE (e.g., a vehicle in a group of platooning vehicles) may experience collisions of the wireless communications from other UEs (e.g., vehicles traveling within a different platoon of vehicles that are traveling in the same or a different direction). Such radio interference may disrupt the intra-platoon wireless communications for one or both of the platoons, leading to reduced or loss of control of the platoon group, and the like.

Aspects of the disclosure are initially described in the context of a wireless communication system. Generally, a platoon of vehicles forms a string topology, e.g., the vehicles are traveling in order down a road. Aspect(s) of the present disclosure generally provide examples of approaches that may be used to mitigate inter-platoon interference. In one example approach, time-frequency radio resources are assigned to a highway where a first subset of the time-frequency radio resources are assigned to one direction on the highway and a second subset of time-frequency radio resources are assigned to the opposite direction of the highway. The first and second subsets of time-frequency radio resources may be non-overlapping in the time domain and/or the frequency domain to avoid collisions. Thus, vehicles within a group of platooning vehicles traveling down a highway may identify the direction of travel for the platoon, identify the corresponding radio resources allocated to that direction, and perform inter-vehicle communications using the radio resources. Vehicles within a group of platooning vehicles traveling in the opposite direction may utilize the second subset of time-frequency radio resources for inter-vehicle communications.

In another example approach, usage of the time-frequency radio resources are randomized to ensure that each resource is only used for a short period of time. For example, the transmission of each message may be picked from a resource pool randomly with a pseudo-random sequence (e.g., time-varying sequence). This may avoid the chance of collisions between platoon vehicle communications while allowing each group of platooning vehicles to use the same set of resources in both directions. Thus, a random seed may be assigned to a group of platooning vehicles traveling in a given direction and a different random seed may be assigned to a group of platooning vehicles traveling in the opposite direction. The vehicles may use the random seed to generate a pseudo-random sequence that is then used to select time-frequency radio resources from a pool of available resources. The pool of available resources may be available for use by the platooning vehicles traveling in different directions, but may still be used since the pseudo-random sequence is unlikely to overlap between the vehicles traveling in opposite directions. The vehicles may then use the selected time-frequency radio resources to perform inter-vehicle (or intra-platoon) communications without interference caused by vehicles traveling in the different direction.

Aspects of the disclosure are further illustrated by and described with reference to apparatus diagrams, system diagrams, and flowcharts that relate to methods to mitigate inter-platoon interference.

FIG. 1 illustrates an example of a wireless communication system 100 in accordance with various aspects of the present disclosure. The wireless communication system 100 includes base stations 105 (e.g., next generation NodeBs (gNodeBs or gNBs)), UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. In some aspects, UEs 115 may also communication with core network through communication links 135.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. Another example of direct UE-115 communications may include V2X and/or V2V communications. Thus, references to a vehicle may refer to a UE 115 where the vehicle is equipped to perform wireless communications using the described techniques.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions. MTC devices may be another example of a vehicle (e.g., a vehicle configured or otherwise supporting wireless communications).

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, network device, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames, which may be identified by a system frame number (SFN). Each frame may include ten 1 ms subframes numbered from 0 to 9, in some examples. A subframe may be further divided into two 0.5 ms slots, each of which contains 6 or 7 modulation symbol periods (depending on the length of the cyclic prefix prepended to each symbol). Excluding the cyclic prefix, each symbol may contain 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, an enhanced component carrier (eCC) may utilize a different symbol duration than other component carriers (CCs), which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication systems may include or support networks used for vehicle based communications, also referred to as V2X, vehicle-to-vehicle (V2V) networks, and/or cellular V2X (C-V2X) networks. Vehicle based communication networks may provide always on telematics where user equipment (UE)s, e.g., v-UEs, communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

In some aspects, one or more of the UEs 115 may include a UE platooning communication manager 101. For example, the UE 115 may be a vehicle (e.g., a vehicle equipped or otherwise configured to communicate using the described wireless techniques) that is a part of a group of platooning vehicles. Generally, the UE 115 may be configured to utilize the described techniques to mitigate wireless communication interference between platoons of vehicles. As one example, the UE platooning communication manager 101 may identify a travel direction of a group of platooning vehicles. The UE platooning communication manager 101 may identify a set of time-frequency radio resources allocated to the travel direction that the platoon of vehicles is traveling in. The UE platooning communication manager 101 may perform inter-vehicle (or intra-platoon) communications with neighboring vehicle(s) of the group of platooning vehicles using the set of time-frequency radio resources.

In another example, the UE platooning communication manager 101 may identify a random seed for time-frequency radio resource identification. The random seed may be based on the travel direction of a group of platooning vehicles. The UE platooning communication manager 101 may use the random seed to generate a pseudo-random sequence for use in selecting a subset of time-frequency radio resources. The subset of time-frequency radio resources may be from a set of available time-frequency radio resources available for use by a plurality of groups of platooning vehicles traveling in different directions. The UE platooning communication manager 101 may select, according to the pseudo-random sequence, the subset of time-frequency radio resources for inter-vehicle communications between the group of platooning vehicles.

Figure 2:
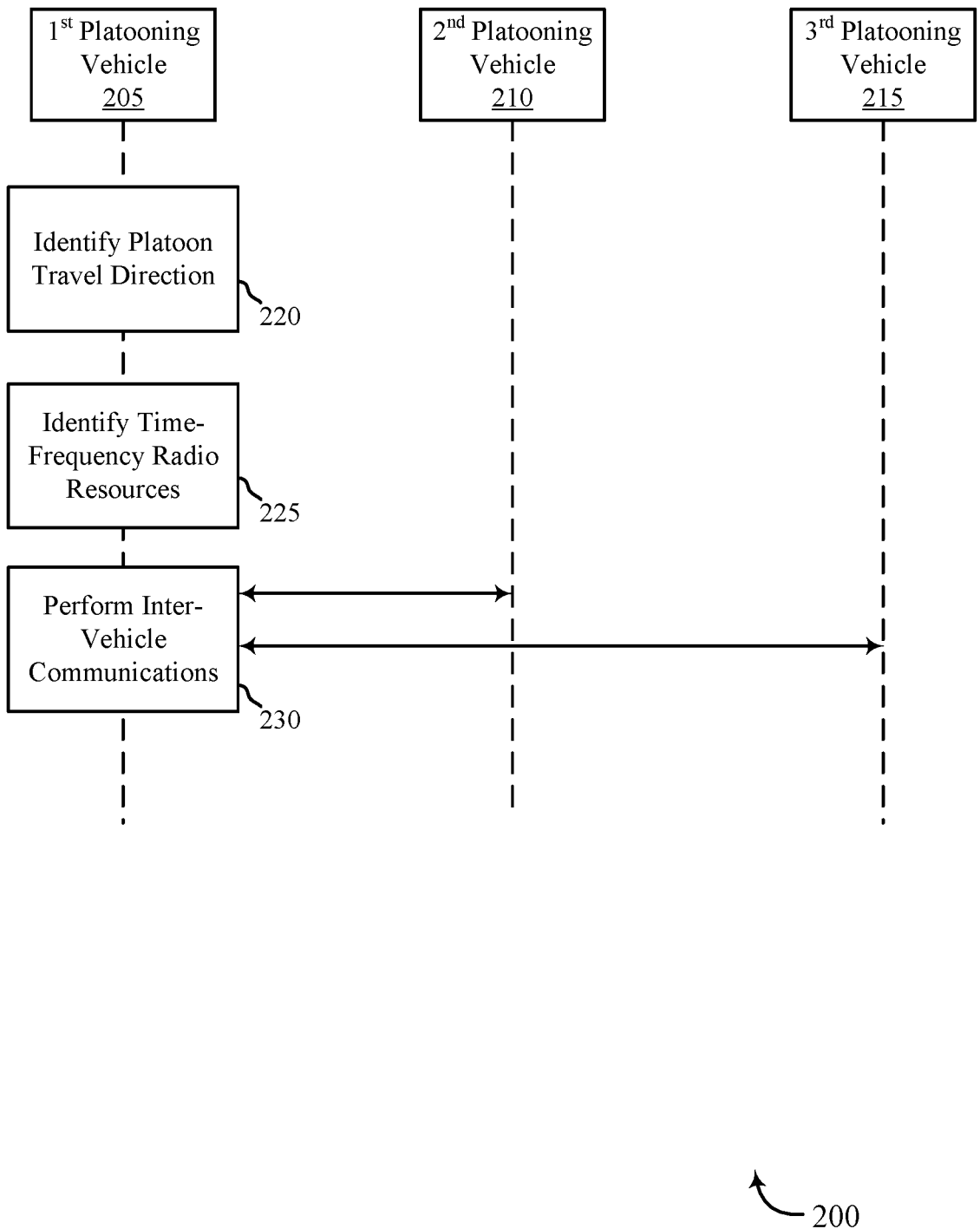
FIG. 2 illustrates an example of a process that supports methods to mitigate inter-platoon interference, in accordance with one or more aspects of the present disclosure.

FIG. 2 illustrates an example of a process 200 that supports methods to mitigate inter-platoon interference, in accordance with one or more aspects of the present disclosure. Process 200 may implement aspect(s) of the wireless communication system of FIG. 1. Process 200 may include a first platooning vehicle 205, a second platooning vehicle 210, and a third platooning vehicle 215, which each may be an example of a UE 115 as described herein.

Generally, the first platooning vehicle 205, the second platooning vehicle 210, and the third platooning vehicle 215 may form a group of platooning vehicles, which may include vehicles traveling along a similar path, in a similar direction, at approximately the same speed, etc. Although the process 200 shows three vehicles in the group of platooning vehicles, it is to be understood that a group of platooning vehicles may include more or fewer vehicles. Moreover, the number and order of vehicles within the group of platooning vehicles may change dynamically, e.g., depending upon traffic conditions, vehicles entering/exiting the roadway, etc.

It is to be understood that references to a vehicle may generally refer to a UE 115, as is described herein. For example, a vehicle may be configured as a UE 115 to perform wireless communications in a wireless communication system using any of the described and/or future wireless communication systems. The vehicle may support V2V, V2X, V2I, etc., wireless communications. However, it can also be appreciated that each vehicle may have different wireless communication capabilities, e.g., communication range, communication throughput capabilities, and the like. For example, the group of platooning vehicles may include legacy and/or advanced communication capabilities.

In some aspects, process 200 illustrates one example where the first platooning vehicle 205 is configured to select communication resources to mitigate interference between groups of platooning vehicles traveling in different directions. However, it is to be understood that any and/or all of the vehicles within a group of platooning vehicles may be configured similarly as the first platooning vehicle 205 to utilize such techniques.

Broadly, process 200 illustrates one example approach to mitigate inter-platoon interference. For example, aspects of the present disclosure may reserve dedicated resource blocks for vehicle platoons for each direction on the highway. For example, for a given highway, road, etc., resource block A may be reserved for platoons of vehicles traveling in one direction of the highway and resource block B may be reserved for platoons of vehicles traveling in the opposite direction on the highway. All other time-frequency radio resources may be used by other non-platoon vehicles. In some aspects, the static split of radio resource may lead to resources that may be unused. However, dividing the platoon resources (e.g., using FDM techniques) in two opposing directions may provide a suitable trade-off between efficiency and safety, especially given that the resources allocated may be a small subset of available V2X resources due to the limited traffic demand associated with platoon communication.

At 220, the first platooning vehicle 205 may identify the travel direction of the platoon of vehicles. For example, the first platooning vehicle 205 may identify a travel direction of the group of platooning vehicles based on various inputs, either alone or in combination. For example, the first platooning vehicle 205 may identify the travel direction based identifying or otherwise determining which lane the platoon of vehicles is traveling in, based on positioning information associated with the vehicle (e.g., from a global-positioning system (GPS) integrated into the vehicle), based on information received from other vehicles in the platoon and/or a base station, and/or based on inputs from a positioning sensor associated with the vehicle (e.g., sensor(s) other than the GPS unit).

At 225, the first platooning vehicle 205 may identify radio resources for the platoon of vehicles. For example, the first platooning vehicle 205 may identify a set of time-frequency radio resources that have been allocated or otherwise assigned to the travel direction that the platoon of vehicles are traveling in. For example, for different directions of a road, highway, etc., different time-frequency radio resources may be allocated to different travel directions to avoid inter-platoon interference. In some aspects, the first platooning vehicle 205 may identify the time-frequency radio resources based on message(s) received from a base station and/or another vehicle in the group of platooning vehicles, for example. The message(s) may convey an indication of the time-frequency radio resources that have been allocated to the travel direction. Additionally or alternatively, the first platooning vehicle 205 may identify the time-frequency radio resources based on pre-configured information, e.g., by accessing a pre-configured resource pool. In some aspects, the radio resources may use licensed and/or unlicensed radio frequency spectrum band(s).

In some aspects, the time-frequency radio resources for the travel direction may use a FDM scheme. For example, the radio resources allocated to one direction of travel may be FDMd with respect to radio resources allocated to a different direction of travel. In other aspects, the radio resources may be use a TDM scheme where the radio resources for one travel direction are TDMd with respect to radio resources allocated to a different direction of travel. In some aspects, the radio resources may use a combination TDM and FDM scheme to mitigate inter-platoon interference.

Although the present description may discuss platoons of vehicles traveling in opposite directions on a roadway, it is to be understood that the described techniques may be applied to vehicle platoons traveling on different roadways. For example, at an interchange where multiple roads cross paths, the allocated time-frequency radio resources may be selected according to the number of intersecting roads. For example, first and second sets of radio resources may be allocated to vehicle platoons traveling in opposite directions on a first road, third and fourth sets of radio resources may be allocated to vehicle platoons traveling in opposite directions on a second road, and so on. The sets of radio resources may be selected to avoid interference (e.g., FDMd and/or TDMd with respect to each other).

At 230, the first platooning vehicle 205 may perform inter-vehicle communications using the identified time-frequency radio resources. For example, the first platooning vehicle 205 may use the time-frequency radio resources to perform inter-vehicle communications with the second platooning vehicle 210 and/or the third platooning vehicle 215. The inter-vehicle communications may include exchanging various V2V, V2X, etc., information to coordinate platooning operations, while mitigating interference caused by and/or introduced to inter-vehicle communications for other group(s) of platooning vehicles.

Figure 3:
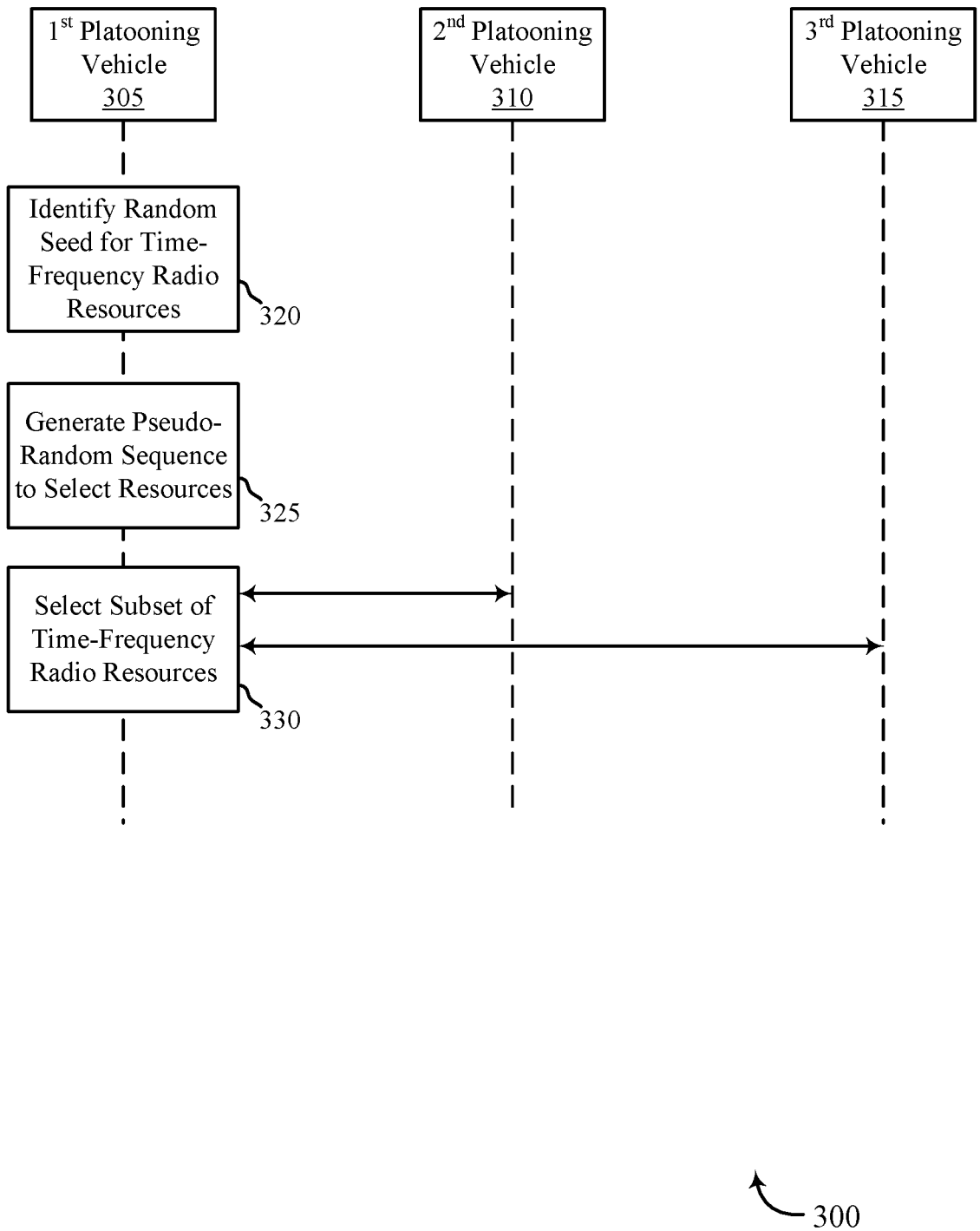
FIG. 3 illustrates an example of a process that supports methods to mitigate inter-platoon interference, in accordance with one or more aspects of the present disclosure.

FIG. 3 illustrates an example of a process 300 that supports methods to mitigate inter-platoon interference, in accordance with one or more aspects of the present disclosure. Process 300 may implement aspect(s) of the wireless communication system of FIG. 1. Process 300 may include a first platooning vehicle 305, a second platooning vehicle 310, and a third platooning vehicle 315, which each may be an example of a UE 115 as described herein.

Generally, the first platooning vehicle 305, the second platooning vehicle 310, and the third platooning vehicle 315 may form a group of platooning vehicles, which may include vehicles traveling along a similar path, in a similar direction, at approximately the same speed, etc. Although the process 300 shows three vehicles in the group of platooning vehicles, it is to be understood that a group of platooning vehicles may include more or fewer vehicles. Moreover, the number and order of vehicles within the group of platooning vehicles may change dynamically, e.g., depending upon traffic conditions, vehicles entering/exiting the roadway, etc.

It is to be understood that references to a vehicle may generally refer to a UE 115, as is described herein. For example, a vehicle may be configured as a UE 115 to perform wireless communications in a wireless communication system using any of the described and/or future wireless communication systems. The vehicle may support V2V, V2X, V2I, etc., wireless communications. However, it can also be appreciated that each vehicle may have different wireless communication capabilities, e.g., communication range, communication throughput capabilities, and the like. For example, the group of platooning vehicles may include legacy and/or advanced communication capabilities.

In some aspects, process 300 illustrates one example where the first platooning vehicle 305 is configured to select communication resources to mitigate interference between groups of platooning vehicles traveling in different directions. However, it is to be understood that any and/or all of the vehicles within a group of vehicles may be configured similarly as the first platooning vehicle 305 to utilize such techniques.

Broadly, process 300 illustrates another example approach to mitigate inter-platoon interference. In some aspects, process 300 may randomize the radio resource usage to ensure each resource is used for a short period of time. For example, two platoons may be traveling in different directions with a travel speed of 30 meters/second, and each platoon's length is 60 meters. Then, the two platoons heading towards each other in a road will overlap for 1 second and the radio interference may last up to 2-3 seconds, depending on the radio transmission range of the platooning vehicles. If the inter-vehicle communication periodicity for each platoon is 20 milliseconds, this may result in a total of 100-150 messages that may be dropped due to collisions, which may cause serious safety concerns.

Process 300, however, provides one solution to avoid such interference where the transmission of each message is picked from a resource pool randomly with a pseudo-random sequence (e.g., a time-varying sequence). This may reduce the chance of persistent collisions between the vehicle platoons. Thus, process 300 may allow platoons to use the same set of resources in both directions, but assign different random seeds in each direction. This may provide for the pseudo-random sequence generated by platoons of different directions to avoid being the same.

At 320, the first platooning vehicle 305 may identify a random seed. For example, the first platooning vehicle 305 may identify the random seed to use for time-frequency radio resource identification. The random seed may be identified based on the travel direction of the group of platooning vehicles that the first platooning vehicle 305 is a member of. Different random seeds may be allocated or otherwise associated with different travel directions such that groups of platooning vehicles in close proximity may not introduce interference to each other. The random seed may be identified based on message(s) received from a base station and/or from other vehicles within the group of platooning vehicles. The random seed may be identified based on a pre-configuration accessed by the first platooning vehicle 305.

In some aspects, the first platooning vehicle 305 may identify the travel direction based identifying or otherwise determining which lane the platoon of vehicles is traveling in, based on positioning information associated with the vehicle (e.g., from a GPS integrated into the vehicle), based on information received from other vehicles in the platoon and/or a base station, and/or based on inputs from a positioning sensor associated with the vehicle (e.g., sensor(s) other than the GPS unit).

At 325, the first platooning vehicle 305 may generate a pseudo-random sequence to use for selecting time-frequency radio resources. For example, the first platooning vehicle 305 may use the random seed to generate a pseudo-random sequence to be used for selecting a subset of time-frequency radio resources. The subset of radio resources may selected from a set of time-frequency radio resources that have been allocated or otherwise associated with groups of platooning vehicles traveling in different directions (e.g., traveling in opposite directions on a roadway, traveling in either direction of an intersecting roadway, etc.).

In some aspects, using different random seeds for different travel directions and then using the random seed to generate a pseudo-random sequence for use in radio resource selection provides a mechanism where wireless communications from different groups of platooning vehicles may not introduce interference and/or, if interference is introduced, reduces the length of the interference. That is, the random seed may be used for generate the pseudo-random sequence for each transmission opportunity, TTI, symbol period, subframe, etc. Accordingly, each transmission opportunity may use different time-frequency radio resources.

At 330, the first platooning vehicle 305 may select a subset of time-frequency radio resources to use for inter-vehicle communications with the second platooning vehicle 310 and/or the third platooning vehicle 315. For example, the first platooning vehicle 305 may use the pseudo-random sequence to select the subset of time-frequency radio resources for use for inter-vehicle communications. The first platooning vehicle 305 may use the random seed to select a new pseudo-random sequence for each new transmission to avoid persistent use of the same time-frequency radio resources for greater than a time period.

Figure 4:
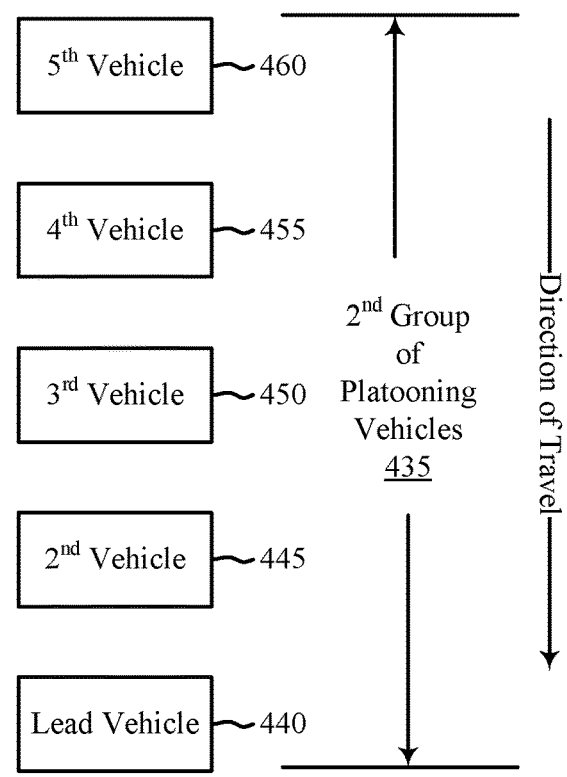
FIG. 4 illustrates an example of a platooning configuration that supports methods to mitigate inter-platoon interference, in accordance with one or more aspects of the present disclosure.
Figure 4:
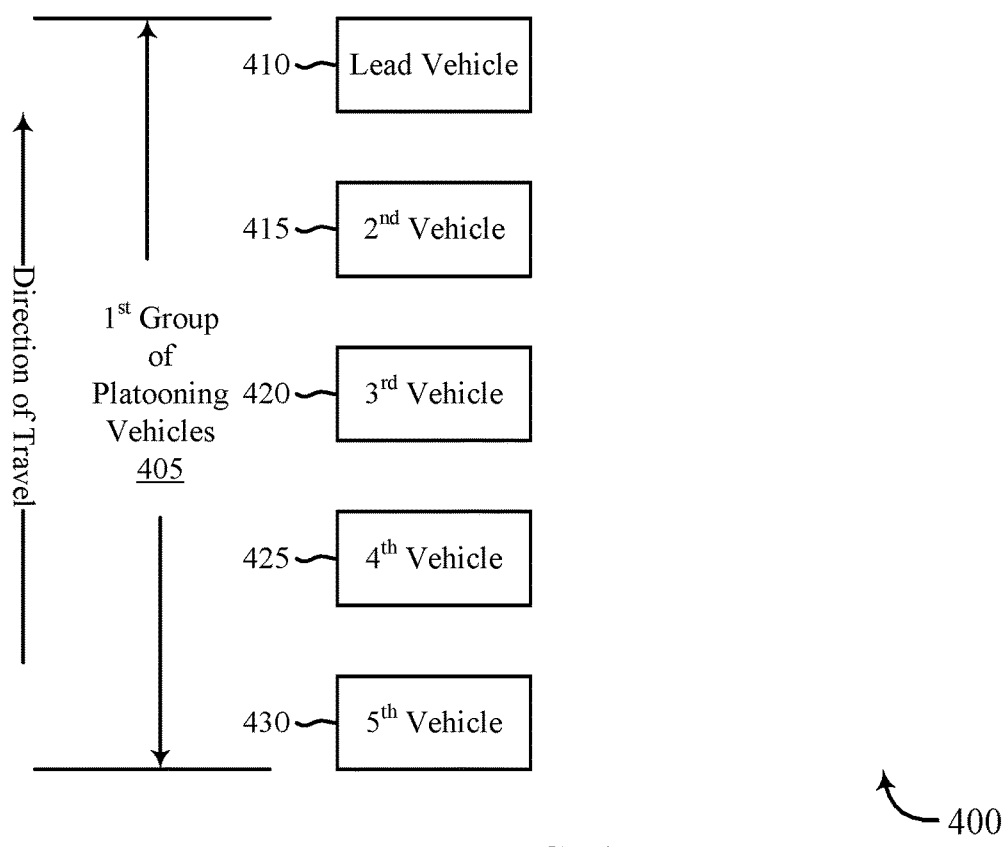

FIG. 4 illustrates an example of a platooning configuration 400 that supports methods to mitigate inter-platoon interference, in accordance with one or more aspects of the present disclosure. Platooning configuration 400 may implement aspect(s) of wireless communication system 100 and/or processes 200/300.

Platooning configuration 400 may include a first group of platooning vehicles 405, which may include a plurality of vehicles. The number and/or location of the vehicles forming the first group of platooning vehicles 405 may change dynamically, e.g., as vehicles leave and/or are added to the platoon, as vehicles change positions within the platoon, etc. Generally, the first group of platooning vehicles 405 may form a string topology which includes vehicle traveling in a relatively straight line (e.g., within the same lane of traffic, within the same lanes of traffic traveling in the same direction of a highway, etc.). Moreover, the first group of platooning vehicles 405 may each be traveling at or about the same speed. In the example platooning configuration 400, the first group of platooning vehicles 405 may include the lead vehicle 410, a second vehicle 415, a third vehicle 420, a fourth vehicle 425, and a fifth vehicle 430.

Platooning configuration 400 may also include a second group of platooning vehicles 435, which may include a plurality of vehicles. The number and/or location of the vehicles forming the second group of platooning vehicles 435 may change dynamically, e.g., as vehicles leave and/or are added to the platoon, as vehicles change positions within the platoon, etc. Generally, the second group of platooning vehicles 435 may form a string topology which includes vehicle traveling in a relatively straight line (e.g., within the same lane of traffic, within the same lanes of traffic traveling in the same direction of a highway, etc.). Moreover, the second group of platooning vehicles 435 may each be traveling at or about the same speed. In the example platooning configuration 400, the second group of platooning vehicles 435 may include the lead vehicle 440, a second vehicle 445, a third vehicle 450, a fourth vehicle 455, and a fifth vehicle 460.

Platooning configuration 400 may include a number of vehicles forming the platoon. In the example platooning configuration 400, there are five vehicles each platoon. It is to be understood that there may be more or fewer vehicles within each group of platooning vehicles and, also, that the number of vehicles within each platoon may change on a dynamic basis.

As illustrated in platooning configuration 400, the first group of platooning vehicles 405 are traveling in a different travel direction (e.g., opposite in this example) with respect to the travel direction of the second group of platooning vehicles 435. Continuing with the example above, the two platoons heading towards each other in a road may overlap for 1 second and the radio interference may last up to 2-3 seconds (e.g., as each platoon approaches and then departs from the other), depending on the radio transmission range of the platooning vehicles. If the inter-vehicle communication periodicity for each platoon is 20 milliseconds, this may result in a total of 100-150 messages that may be dropped due to collisions, which may cause serious safety concerns.

However, one, some, or all of the vehicles in the first and/or second groups of platooning vehicles may be configured to support aspect(s) of the described techniques to mitigate inter-platoon interference. For example and as is described with reference to process 200, time-frequency radio resources may be allocated to different travel directions. Accordingly, the vehicles in the first group of platooning vehicles 405 may identify a first set of radio resources to use for inter-vehicle communications based on their travel direction. Similarly, the vehicles in the second group of platooning vehicles 435 may identify a second set of radio resources to use for inter-vehicle communications based on their respective travel directions. As the radio resources may not overlap (e.g., may use FDM and/or TDM), the first and second groups of platooning vehicles may pass each other without introducing interference.

As another example and as is described with reference to process 300, random seeds may be allocated to different travel directions. Accordingly, the vehicles in the first group of platooning vehicles 405 may use a first random seed to generate a pseudo-random sequence for each transmission opportunity. The pseudo-random sequence may be used to select a subset of time-frequency radio resources for use during the transmission opportunity. Similarly, the vehicles in the second group of platooning vehicles 435 may use a second random seed to generate a pseudo-random sequence for each transmission opportunity. The pseudo-random sequence may be used to select a subset of time-frequency radio resources to use for during the transmission opportunity. Thus, while each group of platooning vehicles may select from the same available set of radio resources, the pseudo-random sequence that is generated per vehicle and/or per transmission opportunity, may prevent the vehicles from using overlapping radio resources for inter-vehicle communications. Further, should a transmission happen to overlap and introduce interference, different radio resources may be used for the next transmission and therefore any interference is limited in time.

Figure 5:
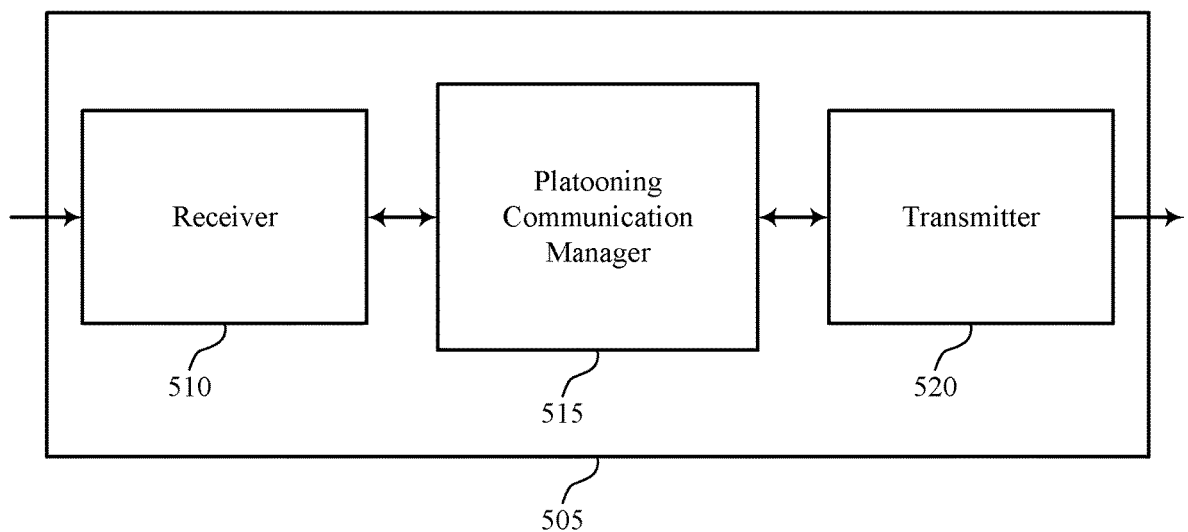
FIGS. 5 through 7 show block diagrams of a device that supports methods to mitigate inter-platoon interference, in accordance with one or more aspects of the present disclosure.

FIG. 5 shows a block diagram 500 of a wireless device 505 that supports methods to mitigate inter-platoon interference, in accordance with one or more aspects of the present disclosure. Wireless device 505 may be an example of aspects of a UE 115 as described herein. Wireless device 505 may include receiver 510, platooning communication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to methods to mitigate inter-platoon interference, etc.). Information may be passed on to other components of the device. The receiver 510 may be an example of aspects of the transceiver 835 described with reference to FIG. 8. The receiver 510 may utilize a single antenna or a set of antennas.

Platooning communication manager 515 may be an example of aspects of the platooning communication manager 815 described with reference to FIG. 8. Platooning communication manager 515 and/or at least some of its various sub-components may be implemented in hardware, software executed by a processor, firmware, or any combination thereof. If implemented in software executed by a processor, the functions of the platooning communication manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The platooning communication manager 515 and/or at least some of its various sub-components may be physically located at various positions, including being distributed such that portions of functions are implemented at different physical locations by one or more physical devices. In some examples, platooning communication manager 515 and/or at least some of its various sub-components may be a separate and distinct component in accordance with various aspects of the present disclosure. In other examples, platooning communication manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Platooning communication manager 515 may identify a travel direction of a group of platooning vehicles. Platooning communication manager 515 may identify a set of time-frequency radio resources allocated to the travel direction. Platooning communication manager 515 may perform inter-vehicle communications with one or more neighboring vehicles of the group of platooning vehicles using the set of time-frequency radio resources. The platooning communication manager 515 may also identify a random seed for time-frequency radio resource identification, the random seed based on a travel direction of a group of platooning vehicles. Platooning communication manager 515 may generate, based on the random seed, a pseudo-random sequence for use in selecting a subset of time-frequency radio resources, the subset of time-frequency radio resources being from a set of available time-frequency radio resources available for use by a set of groups of platooning vehicles traveling in different directions. Platooning communication manager 515 may select, according to the pseudo-random sequence, the subset of time-frequency radio resources for inter-vehicle communications between the group of platooning vehicles.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
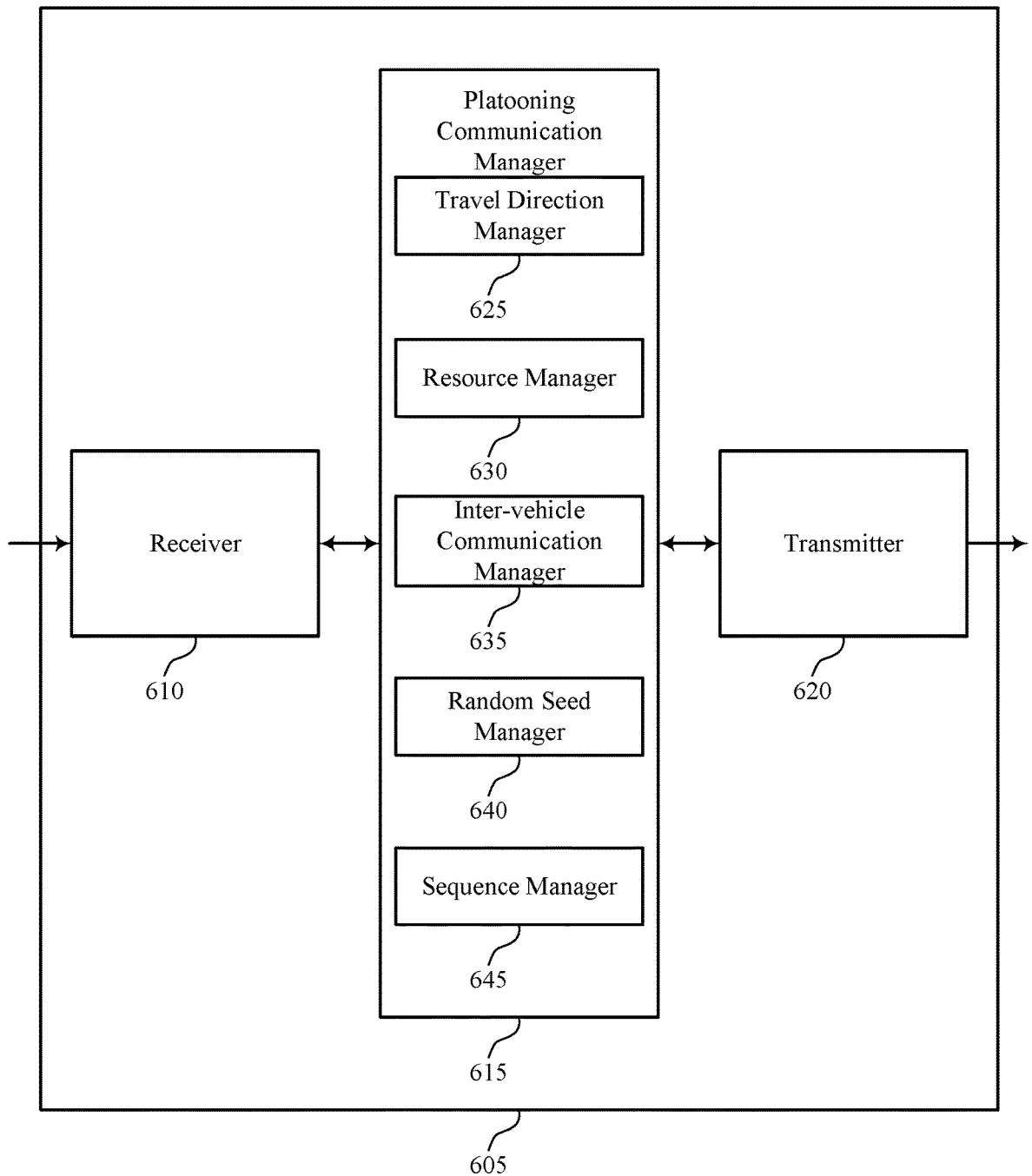

FIG. 6 shows a block diagram 600 of a wireless device 605 that supports methods to mitigate inter-platoon interference, in accordance with one or more aspects of the present disclosure. Wireless device 605 may be an example of aspects of a wireless device 505 or a UE 115 as described herein. Wireless device 605 may include receiver 610, platooning communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to methods to mitigate inter-platoon interference, etc.). Information may be passed on to other components of the device. The receiver 610 may be an example of aspects of the transceiver 835 described with reference to FIG. 8. The receiver 610 may utilize a single antenna or a set of antennas.

Platooning communication manager 615 may be an example of aspects of the platooning communication manager 815 described with reference to FIG. 8. Platooning communication manager 615 may also include travel direction manager 625, resource manager 630, inter-vehicle communication manager 635, random seed manager 640, and sequence manager 645.

Travel direction manager 625 may identify a travel direction of a group of platooning vehicles. Travel direction manager 625 may identify the travel direction based on identifying a lane in which the group of platooning vehicles are traveling, accessing multiple instances of positioning information associated with the vehicle over a time period, receiving travel direction information from at least one other vehicle in the group of platooning vehicles, based on a positioning and/or orientation sensor(s) associated with the vehicle (e.g., gyroscope(s), accelerometer(s), and the like), or combinations thereof.

Resource manager 630 may identify a set of time-frequency radio resources allocated to the travel direction. Resource manager 630 may frequency-division multiplex the set of time-frequency radio resources allocated to the travel direction with a second set of time-frequency radio resources allocated to platooning vehicles traveling in a different travel direction. Resource manager 630 may receive a resource allocation message conveying information identifying the set of time-frequency radio resources allocated to the travel direction. Resource manager 630 may access a pre-configured resource pool to identify the set of time-frequency radio resources allocated to the travel direction. Resource manager 630 may select, according to the pseudo-random sequence, the subset of time-frequency radio resources for inter-vehicle communications between the group of platooning vehicles. In some cases, the time-frequency radio resources include a resource in a licensed radio frequency spectrum band, a resource in an unlicensed radio frequency spectrum band, or combinations thereof.

Inter-vehicle communication manager 635 may perform inter-vehicle communications with one or more neighboring vehicles of the group of platooning vehicles using the set of time-frequency radio resources. Inter-vehicle communication manager 635 may perform inter-vehicle communications with one or more neighboring vehicles within the group of platooning vehicles using the subset of time-frequency radio resources.

Random seed manager 640 may identify a random seed for time-frequency radio resource identification, the random seed based on a travel direction of a group of platooning vehicles and receive a message conveying an indication of the random seed.

Sequence manager 645 may generate, based on the random seed, a pseudo-random sequence for use in selecting a subset of time-frequency radio resources, the subset of time-frequency radio resources being from a set of available time-frequency radio resources available for use by a set of groups of platooning vehicles traveling in different directions.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
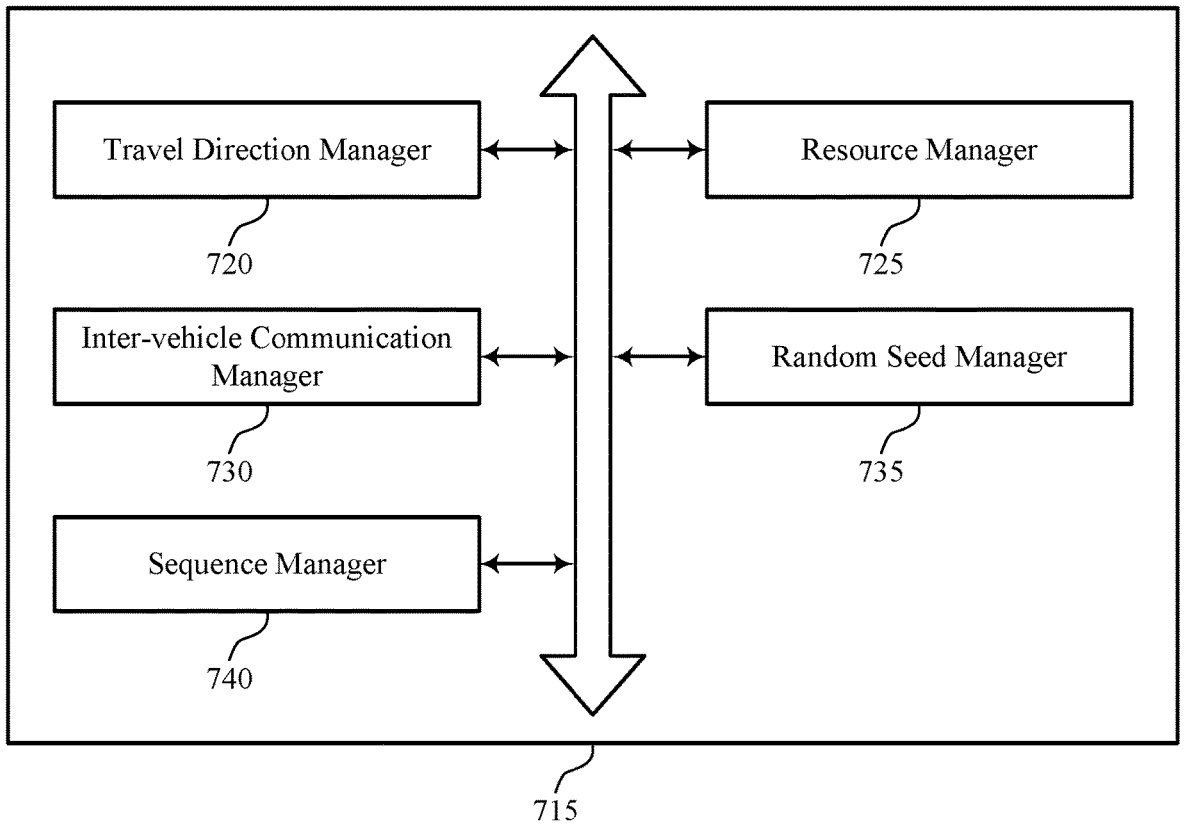

FIG. 7 shows a block diagram 700 of a platooning communication manager 715 that supports methods to mitigate inter-platoon interference, in accordance with one or more aspects of the present disclosure. The platooning communication manager 715 may be an example of aspects of a platooning communication manager 515, a platooning communication manager 615, or a platooning communication manager 815 described with reference to FIGS. 5, 6, and 8. The platooning communication manager 715 may include travel direction manager 720, resource manager 725, inter-vehicle communication manager 730, random seed manager 735, and sequence manager 740. Each of these modules may communicate, directly or indirectly, with one another (e.g., via one or more buses).

Travel direction manager 720 may identify a travel direction of a group of platooning vehicles. Travel direction manager 720 may identify the travel direction based on identifying a lane in which the group of platooning vehicles are traveling, accessing multiple instances of positioning information associated with the vehicle over a time period, receiving travel direction information from at least one other vehicle in the group of platooning vehicles, based on a positioning and/or orientation sensor(s) associated with the vehicle, or combinations thereof.

Resource manager 725 may identify a set of time-frequency radio resources allocated to the travel direction. Resource manager 725 may frequency-division multiplex the set of time-frequency radio resources allocated to the travel direction with a second set of time-frequency radio resources allocated to platooning vehicles traveling in a different travel direction. Resource manager 725 may receive a resource allocation message conveying information identifying the set of time-frequency radio resources allocated to the travel direction. Resource manager 725 may access a pre-configured resource pool to identify the set of time-frequency radio resources allocated to the travel direction. Resource manager 725 may select, according to the pseudo-random sequence, the subset of time-frequency radio resources for inter-vehicle communications between the group of platooning vehicles. In some cases, the time-frequency radio resources include a resource in a licensed radio frequency spectrum band, a resource in an unlicensed radio frequency spectrum band, or combinations thereof.

Inter-vehicle communication manager 730 may perform inter-vehicle communications with one or more neighboring vehicles of the group of platooning vehicles using the set of time-frequency radio resources. Inter-vehicle communication manager 730 may perform inter-vehicle communications with one or more neighboring vehicles within the group of platooning vehicles using the subset of time-frequency radio resources.

Random seed manager 735 may identify a random seed for time-frequency radio resource identification, the random seed based on a travel direction of a group of platooning vehicles and receive a message conveying an indication of the random seed.

Sequence manager 740 may generate, based on the random seed, a pseudo-random sequence for use in selecting a subset of time-frequency radio resources, the subset of time-frequency radio resources being from a set of available time-frequency radio resources available for use by a set of groups of platooning vehicles traveling in different directions.

Figure 8:
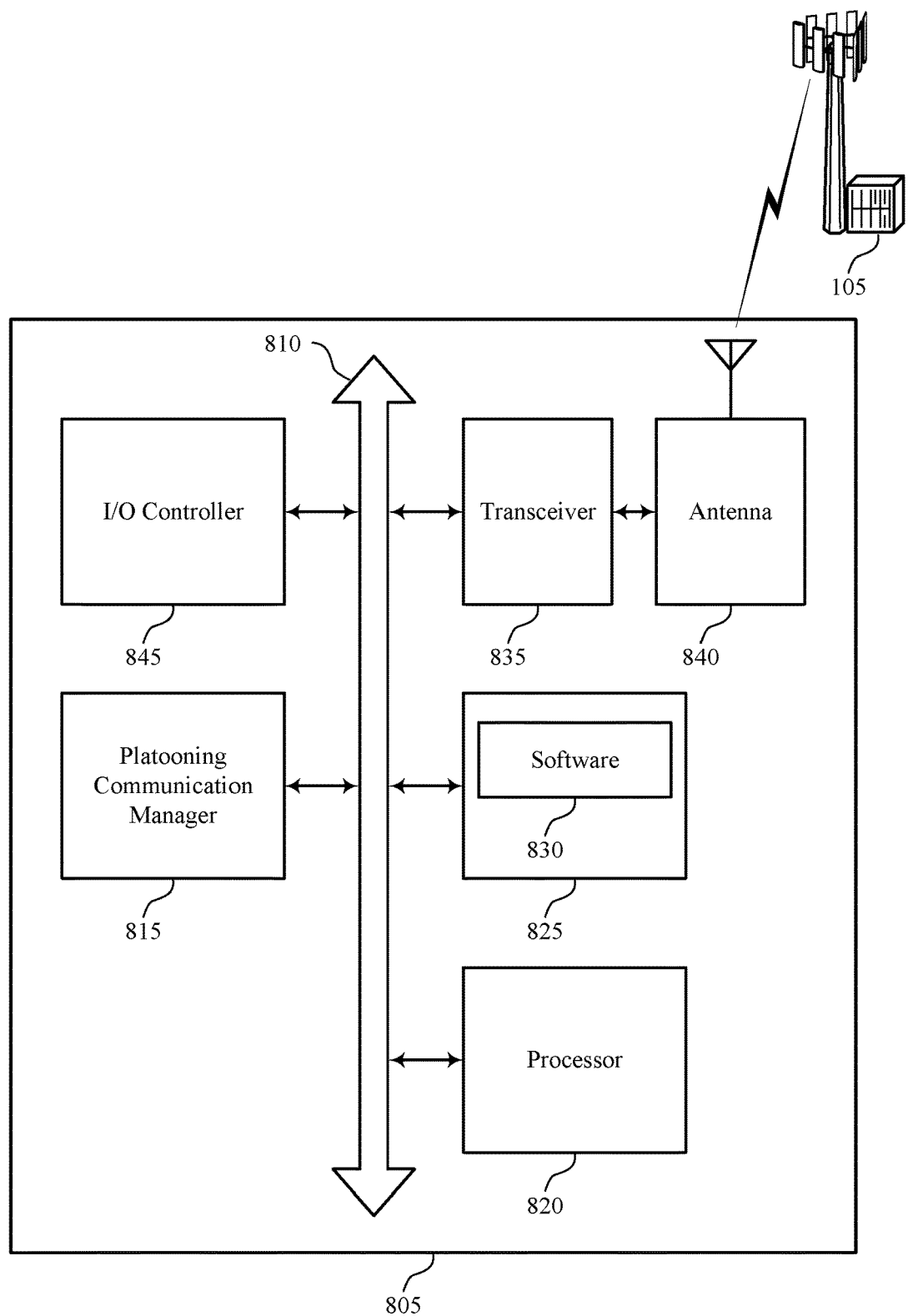
FIG. 8 illustrates a block diagram of a system including a UE that supports methods to mitigate inter-platoon interference, in accordance with one or more aspects of the present disclosure.

FIG. 8 shows a diagram of a system 800 including a device 805 that supports methods to mitigate inter-platoon interference, in accordance with one or more aspects of the present disclosure. Device 805 may be an example of or include the components of wireless device 505, wireless device 605, or a UE 115 as described herein. Device 805 may include components for bi-directional voice and data communications including components for transmitting and receiving communications, including platooning communication manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting methods to mitigate inter-platoon interference).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support methods to mitigate inter-platoon interference. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
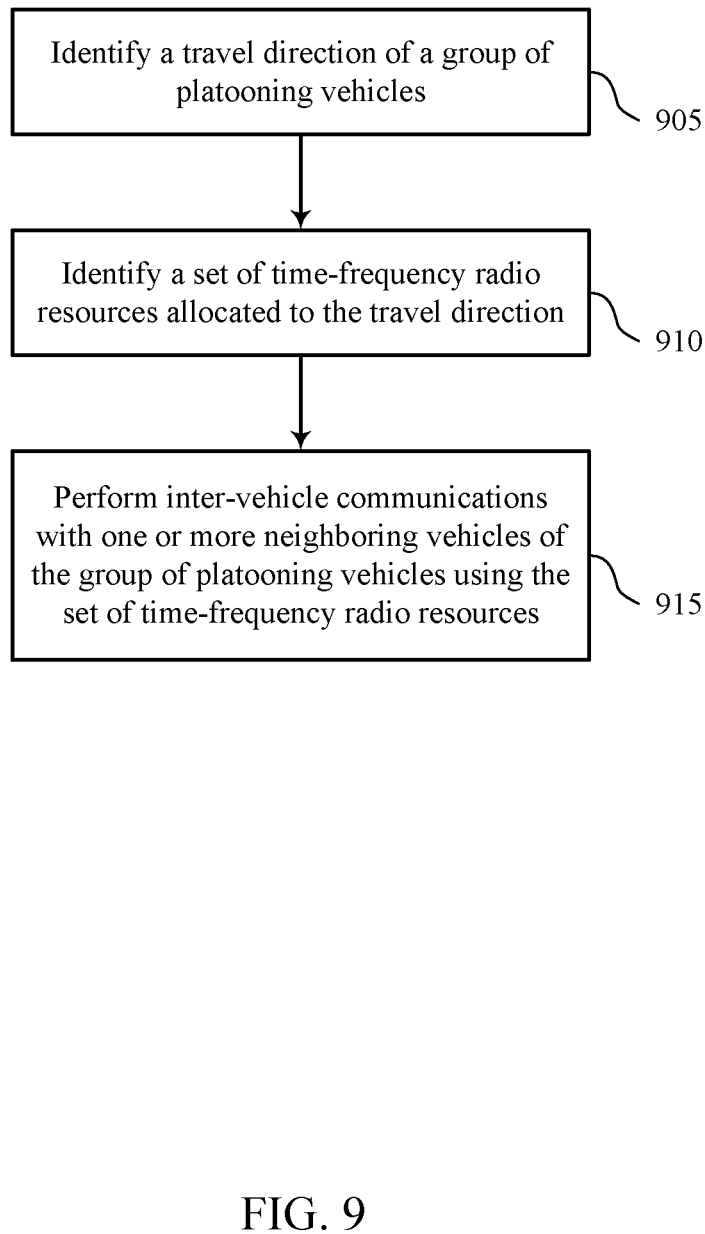
FIGS. 9 through 12 illustrate methods for methods to mitigate inter-platoon interference, in accordance with one or more aspects of the present disclosure.

FIG. 9 shows a flowchart illustrating a method 900 for methods to mitigate inter-platoon interference, in accordance with one or more aspects of the present disclosure. The operations of method 900 may be implemented by a UE 115 or its components as described herein. For example, the operations of method 900 may be performed by a platooning communication manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may identify a travel direction of a group of platooning vehicles. The operations of block 905 may be performed according to the methods described with reference to FIGS. 1 through 4. In certain examples, aspects of the operations of block 905 may be performed by a travel direction manager as described with reference to FIGS. 5 through 8.

At block 910 the UE 115 may identify a set of time-frequency radio resources allocated to the travel direction. The operations of block 910 may be performed according to the methods described with reference to FIGS. 1 through 4. In certain examples, aspects of the operations of block 910 may be performed by a resource manager as described with reference to FIGS. 5 through 8.

At block 915 the UE 115 may perform inter-vehicle communications with one or more neighboring vehicles of the group of platooning vehicles using the set of time-frequency radio resources. The operations of block 915 may be performed according to the methods described with reference to FIGS. 1 through 4. In certain examples, aspects of the operations of block 915 may be performed by a inter-vehicle communication manager as described with reference to FIGS. 5 through 8.

Figure 10:
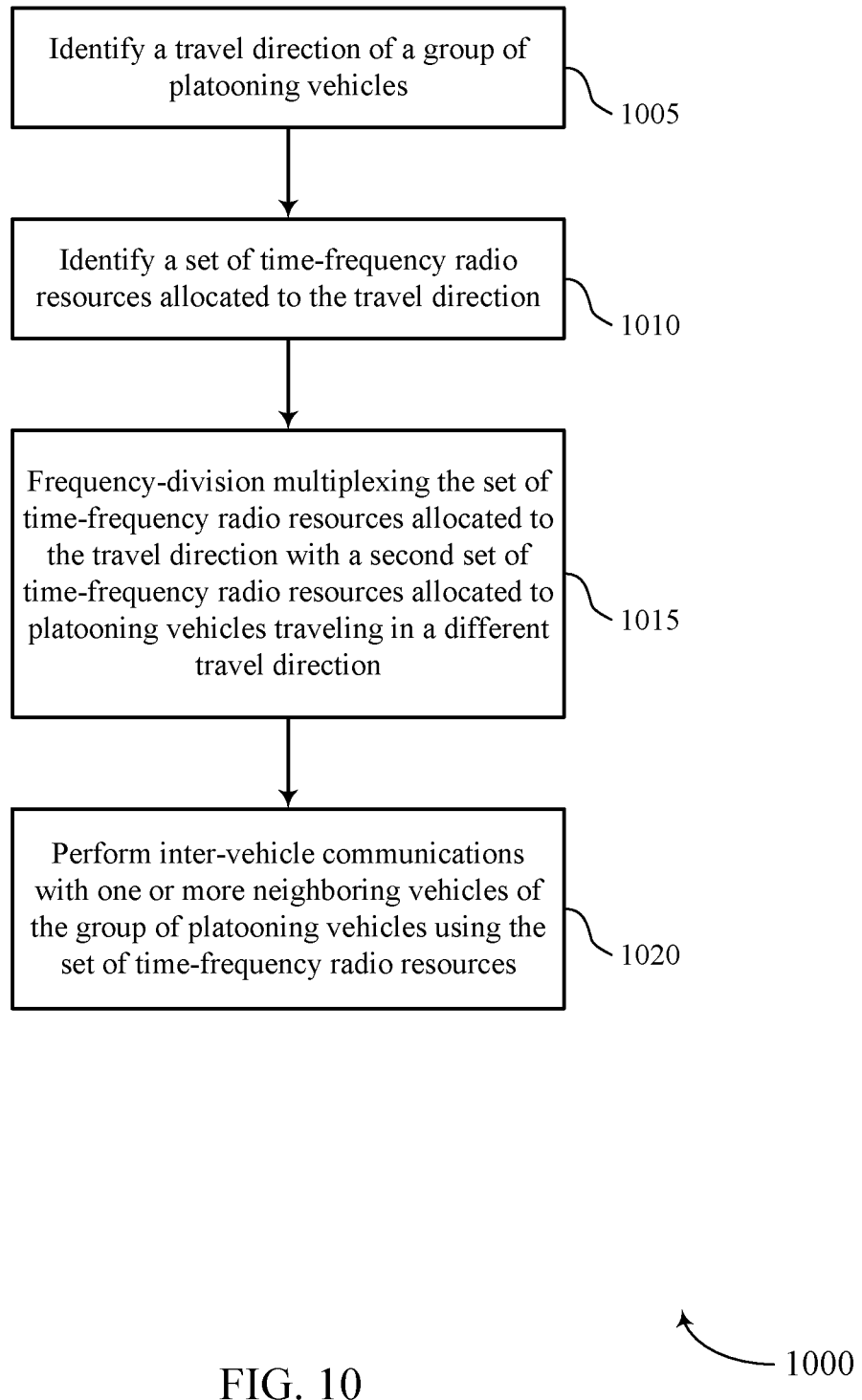

FIG. 10 shows a flowchart illustrating a method 1000 for methods to mitigate inter-platoon interference, in accordance with one or more aspects of the present disclosure. The operations of method 1000 may be implemented by a UE 115 or its components as described herein. For example, the operations of method 1000 may be performed by a platooning communication manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may identify a travel direction of a group of platooning vehicles. The operations of block 1005 may be performed according to the methods described with reference to FIGS. 1 through 4. In certain examples, aspects of the operations of block 1005 may be performed by a travel direction manager as described with reference to FIGS. 5 through 8.

At block 1010 the UE 115 may identify a set of time-frequency radio resources allocated to the travel direction. The operations of block 1010 may be performed according to the methods described with reference to FIGS. 1 through 4. In certain examples, aspects of the operations of block 1010 may be performed by a resource manager as described with reference to FIGS. 5 through 8.

At block 1015 the UE 115 may frequency-division multiplexing the set of time-frequency radio resources allocated to the travel direction with a second set of time-frequency radio resources allocated to platooning vehicles traveling in a different travel direction. The operations of block 1015 may be performed according to the methods described with reference to FIGS. 1 through 4. In certain examples, aspects of the operations of block 1015 may be performed by a resource manager as described with reference to FIGS. 5 through 8.

At block 1020 the UE 115 may perform inter-vehicle communications with one or more neighboring vehicles of the group of platooning vehicles using the set of time-frequency radio resources. The operations of block 1020 may be performed according to the methods described with reference to FIGS. 1 through 4. In certain examples, aspects of the operations of block 1020 may be performed by a inter-vehicle communication manager as described with reference to FIGS. 5 through 8.

Figure 11:
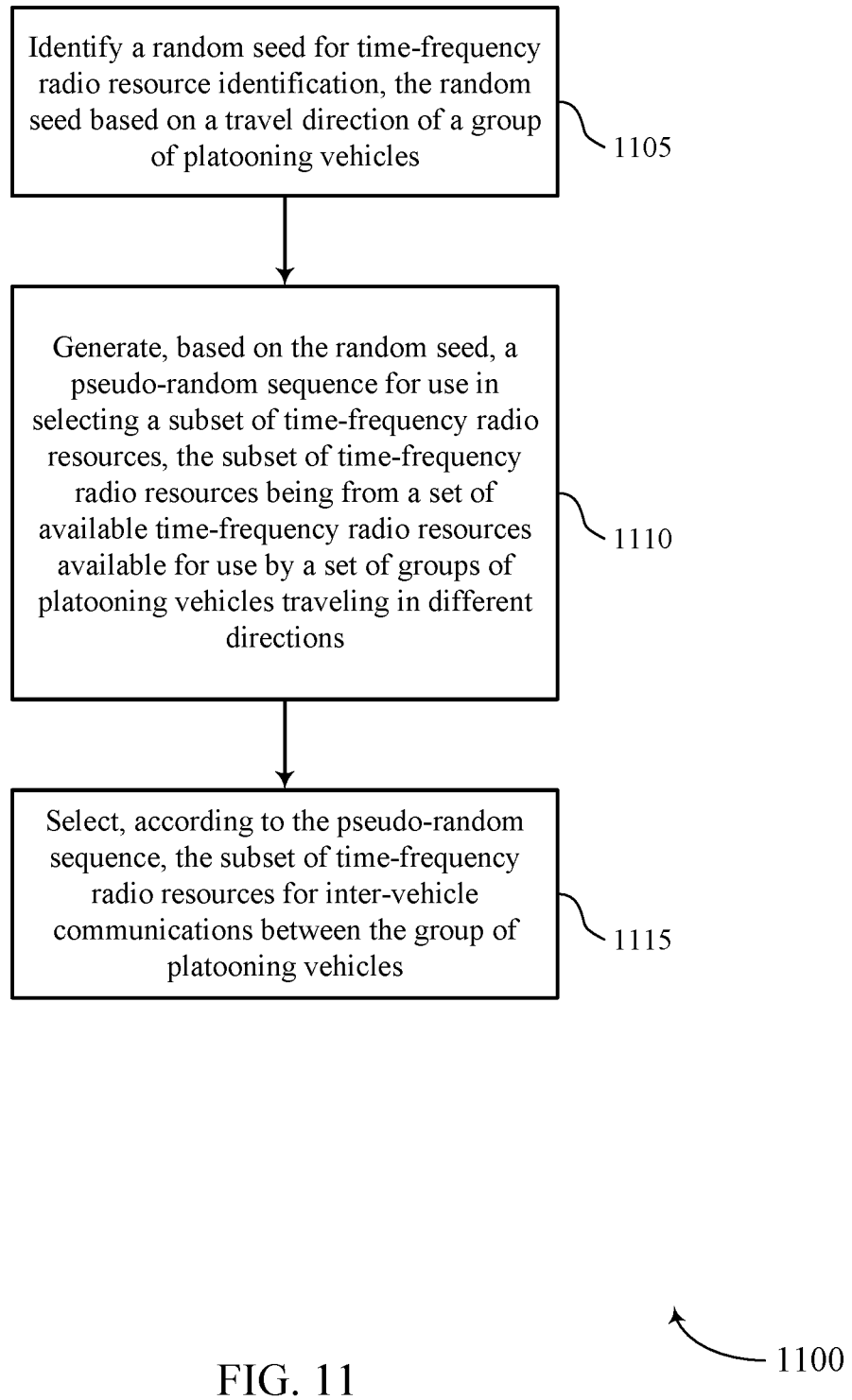

FIG. 11 shows a flowchart illustrating a method 1100 for methods to mitigate inter-platoon interference, in accordance with one or more aspects of the present disclosure. The operations of method 1100 may be implemented by a UE 115 or its components as described herein. For example, the operations of method 1100 may be performed by a platooning communication manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify a random seed for time-frequency radio resource identification, the random seed based on a travel direction of a group of platooning vehicles. The operations of block 1105 may be performed according to the methods described with reference to FIGS. 1 through 4. In certain examples, aspects of the operations of block 1105 may be performed by a random seed manager as described with reference to FIGS. 5 through 8.

At block 1110 the UE 115 may generate, based at least in part on the random seed, a pseudo-random sequence for use in selecting a subset of time-frequency radio resources, the subset of time-frequency radio resources being from a set of available time-frequency radio resources available for use by a plurality of groups of platooning vehicles traveling in different directions. The operations of block 1110 may be performed according to the methods described with reference to FIGS. 1 through 4. In certain examples, aspects of the operations of block 1110 may be performed by a sequence manager as described with reference to FIGS. 5 through 8.

At block 1115 the UE 115 may select, according to the pseudo-random sequence, the subset of time-frequency radio resources for inter-vehicle communications between the group of platooning vehicles. The operations of block 1115 may be performed according to the methods described with reference to FIGS. 1 through 4. In certain examples, aspects of the operations of block 1115 may be performed by a resource manager as described with reference to FIGS. 5 through 8.

Figure 12:
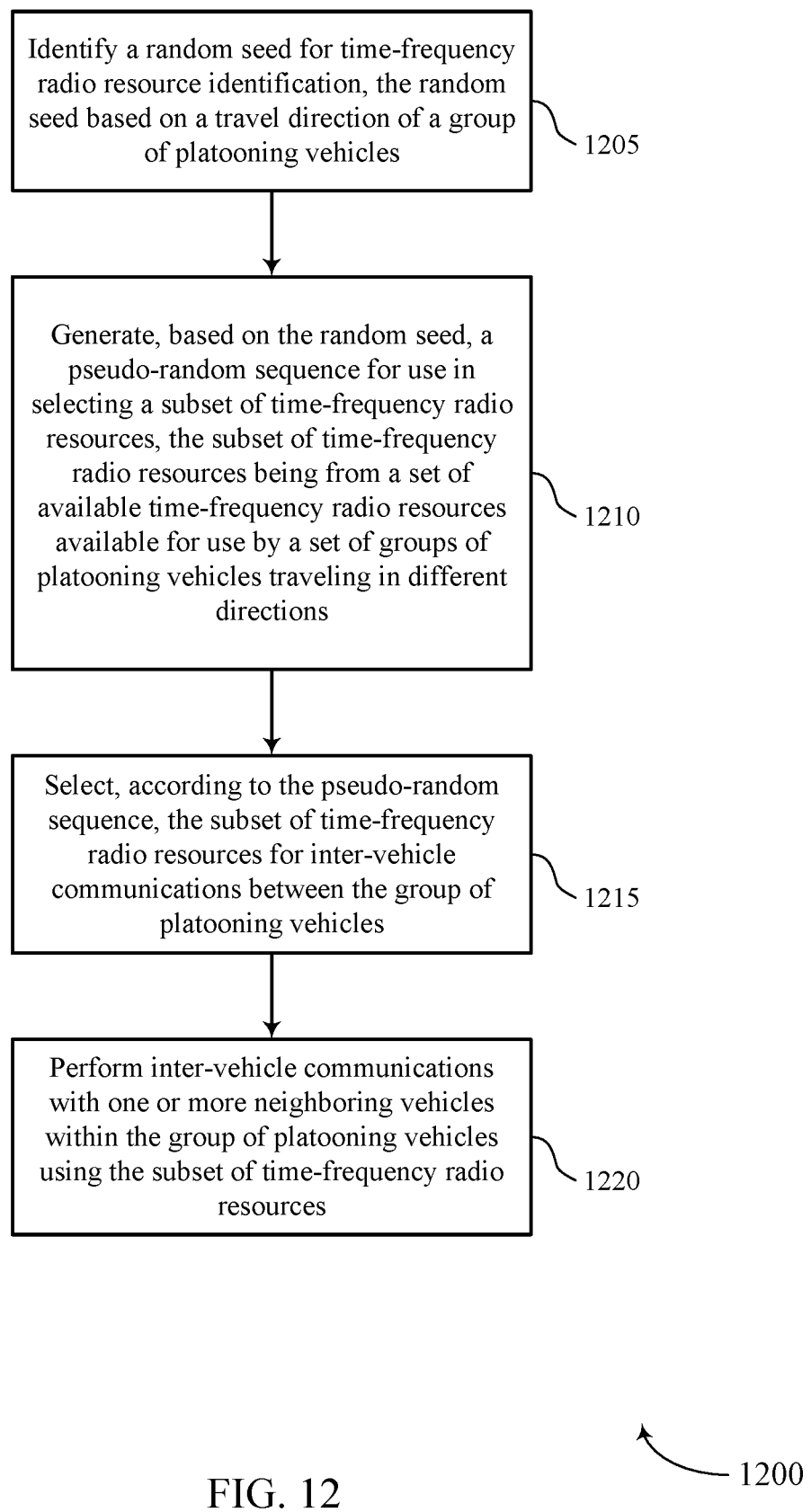

FIG. 12 shows a flowchart illustrating a method 1200 for methods to mitigate inter-platoon interference, in accordance with one or more aspects of the present disclosure. The operations of method 1200 may be implemented by a UE 115 or its components as described herein. For example, the operations of method 1200 may be performed by a platooning communication manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a random seed for time-frequency radio resource identification, the random seed based on a travel direction of a group of platooning vehicles. The operations of block 1205 may be performed according to the methods described with reference to FIGS. 1 through 4. In certain examples, aspects of the operations of block 1205 may be performed by a random seed manager as described with reference to FIGS. 5 through 8.

At block 1210 the UE 115 may generate, based at least in part on the random seed, a pseudo-random sequence for use in selecting a subset of time-frequency radio resources, the subset of time-frequency radio resources being from a set of available time-frequency radio resources available for use by a plurality of groups of platooning vehicles traveling in different directions. The operations of block 1210 may be performed according to the methods described with reference to FIGS. 1 through 4. In certain examples, aspects of the operations of block 1210 may be performed by a sequence manager as described with reference to FIGS. 5 through 8.

At block 1215 the UE 115 may select, according to the pseudo-random sequence, the subset of time-frequency radio resources for inter-vehicle communications between the group of platooning vehicles. The operations of block 1215 may be performed according to the methods described with reference to FIGS. 1 through 4. In certain examples, aspects of the operations of block 1215 may be performed by a resource manager as described with reference to FIGS. 5 through 8.

At block 1220 the UE 115 may perform inter-vehicle communications with one or more neighboring vehicles within the group of platooning vehicles using the subset of time-frequency radio resources. The operations of block 1220 may be performed according to the methods described with reference to FIGS. 1 through 4. In certain examples, aspects of the operations of block 1220 may be performed by an inter-vehicle communication manager as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first travel direction of a group of platooning vehicles;
   identifying a first set of time-frequency radio resources allocated to the first travel direction, wherein the first set of time-frequency radio resources allocated to the first travel direction are different from a second set of time-frequency radio resources allocated to a second travel direction; and
   performing inter-vehicle communications with one or more neighboring vehicles of the group of platooning vehicles using the first set of time-frequency radio resources.

2. The method of claim 1, further comprising:
   frequency-division multiplexing the first set of time-frequency radio resources allocated to the first travel direction with the second set of time-frequency radio resources allocated to platooning vehicles traveling in a different travel direction.

3. The method of claim 1, further comprising:
   identifying the first travel direction based on identifying a lane in which the group of platooning vehicles are traveling, accessing multiple instances of positioning information associated with the vehicle over a time period, receiving first travel direction information from at least one other vehicle in the group of platooning vehicles, based on a positioning or orientation sensor associated with the vehicle, or combinations thereof.

4. The method of claim 1, further comprising:
receiving a resource allocation message conveying information identifying the first set of time-frequency radio resources allocated to the first travel direction.

5. The method of claim 1, further comprising:
accessing a pre-configured resource pool to identify the first set of time-frequency radio resources allocated to the first travel direction.

6. The method of claim 1, wherein the first set of time-frequency radio resources comprise a resource in a licensed radio frequency spectrum band, a resource in an unlicensed radio frequency spectrum band, or combinations thereof.

7. A method for wireless communication, comprising:
identifying a first random seed for time-frequency radio resource identification, the first random seed allocated to a first travel direction of a group of platooning vehicles, wherein the first random seed allocated to the first travel direction is different from a second random seed allocated to a second travel direction;
generating, based at least in part on the first random seed, a pseudo-random sequence for use in selecting a subset of time-frequency radio resources, the subset of time-frequency radio resources being from a set of available time-frequency radio resources available for use by a plurality of groups of platooning vehicles traveling in different directions; and
selecting, according to the pseudo-random sequence, the subset of time-frequency radio resources for inter-vehicle communications between the group of platooning vehicles.

8. The method of claim 7, further comprising:
performing inter-vehicle communications with one or more neighboring vehicles within the group of platooning vehicles using the subset of time-frequency radio resources.

9. The method of claim 7, further comprising:
identifying the first travel direction of the group of platooning vehicles based on identifying a lane in which the group of platooning vehicles are traveling, accessing multiple instances of positioning information associated with the vehicle over a predetermined time period, receiving first travel direction information from at least one other vehicle in the group of platooning vehicles, based on a positioning or orientation sensor associated with the vehicle, or combinations thereof.

10. The method of claim 7, further comprising:
receiving a resource allocation message conveying information identifying the set of available time-frequency radio resources.

11. The method of claim 7, further comprising:
accessing a pre-configured resource pool to identify the set of available time-frequency radio resources.

12. The method of claim 7, wherein the set of available time-frequency radio resources comprise a resource in a licensed radio frequency spectrum band, a resource in an unlicensed radio frequency spectrum band, or combinations thereof.

13. The method of claim 7, further comprising:
identifying the first travel direction based on identifying a lane in which the group of platooning vehicles are traveling, accessing multiple instances of positioning information associated with the vehicle over a time period, receiving first travel direction information from at least one other vehicle in the group of platooning vehicles, based on a positioning or orientation sensor associated with the vehicle, or combinations thereof.

14. An apparatus for wireless communication, comprising:
a processor;
memory coupled with the processor; and
instructions stored in the memory and executable by the processor to cause the apparatus to:
identify a first travel direction of a group of platooning vehicles;
identify a first set of time-frequency radio allocated to the first travel direction, wherein the first set of time-frequency radio resources allocated to the first travel direction are different from a second set of time-frequency radio resources allocated to a second travel direction; and
perform inter-vehicle communications with one or more neighboring vehicles of the group of platooning vehicles using the first set of time-frequency radio resources.

15. The apparatus of claim 14, wherein the instructions are further executable by the processor to cause the apparatus to:
frequency-division multiplexing the first set of time-frequency radio resources allocated to the first travel direction with the second set of time-frequency radio resources allocated to platooning vehicles traveling in a different travel direction.

16. The apparatus of claim 14, wherein the instructions are further executable by the processor to cause the apparatus to:
identify the first travel direction based on identifying a lane in which the group of platooning vehicles are traveling, accessing multiple instances of positioning information associated with the vehicle over a time period, receiving first travel direction information from at least one other vehicle in the group of platooning vehicles, based on a positioning or orientation sensor associated with the vehicle, or combinations thereof.

17. The apparatus of claim 14, wherein the instructions are further executable by the processor to cause the apparatus to:
receive a resource allocation message conveying information identifying the first set of time-frequency radio resources allocated to the first travel direction.

18. The apparatus of claim 14, wherein the instructions are further executable by the processor to cause the apparatus to:
access a pre-configured resource pool to identify the first set of time-frequency radio resources allocated to the first travel direction.

19. The apparatus of claim 14, wherein the first set of time-frequency radio resources comprise a resource in a licensed radio frequency spectrum band, a resource in an unlicensed radio frequency spectrum band, or combinations thereof.

20. An apparatus for wireless communication, comprising:
a processor;
memory coupled with the processor; and
instructions stored in the memory and executable by the processor to cause the apparatus to:
identify a first random seed for time-frequency radio resource identification, the first random seed allocated to a first travel direction of a group of platooning vehicles, wherein the first random seed allocated to the first travel direction is different from a second random seed allocated to a second travel direction;

generate, based at least in part on the first random seed, a pseudo-random sequence for use in selecting a subset of time-frequency radio resources, the subset of time-frequency radio resources being from a set of available time-frequency radio resources available for use by a plurality of groups of platooning vehicles traveling in different directions; and select, according to the pseudo-random sequence, the subset of time-frequency radio resources for inter-vehicle communications between the group of platooning vehicles.

21. The apparatus of claim 20, wherein the instructions are further executable by the processor to cause the apparatus to:

perform inter-vehicle communications with one or more neighboring vehicles within the group of platooning vehicles using the subset of time-frequency radio resources.

22. The apparatus of claim 20, wherein the instructions are further executable by the processor to cause the apparatus to:

identify the first travel direction of the group of platooning vehicles based on identifying a lane in which the group of platooning vehicles are traveling, access multiple instances of positioning information associated with the vehicle over a predetermined time period, receive first travel direction information from at least one other vehicle in the group of platooning vehicles, based on a positioning or orientation sensor associated with the vehicle, or combinations thereof.

23. The apparatus of claim 20, wherein the instructions are further executable by the processor to cause the apparatus to:

receive a resource allocation message conveying information identifying the set of available time-frequency radio resources.

24. The apparatus of claim 20, wherein the instructions are further executable by the processor to cause the apparatus to:

access a pre-configured resource pool to identify the set of available time-frequency radio resources.

25. The apparatus of claim 20, wherein the instructions are further executable by the processor to cause the apparatus to:

identify the first travel direction based on identifying a lane in which the group of platooning vehicles are traveling, accessing multiple instances of positioning information associated with the vehicle over a time period, receive first travel direction information from at least one other vehicle in the group of platooning vehicles, based on a positioning or orientation sensor associated with the vehicle, or combinations thereof.

26. The apparatus of claim 20, wherein the set of available time-frequency radio resources comprise a resource in a licensed radio frequency spectrum band, a resource in an unlicensed radio frequency spectrum band, or combinations thereof.

* * * * *